(12) United States Patent
Johanson

(10) Patent No.: US 6,547,108 B2
(45) Date of Patent: Apr. 15, 2003

(54) PRESSURE-ACTIVATED FLEXIBLE VALVE

(75) Inventor: James E. Johanson, Chatham, NY (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/944,700

(22) Filed: Aug. 31, 2001

(65) Prior Publication Data

US 2003/0042274 A1 Mar. 6, 2003

(51) Int. Cl.$^7$ ................................................ B65D 25/40
(52) U.S. Cl. ...................... 222/387; 222/494; 222/496; 222/513; 347/86
(58) Field of Search ........................... 222/212, 387, 222/491–496, 511, 513, 515; 137/859; 347/85–87

(56) References Cited

U.S. PATENT DOCUMENTS

| | | | | |
|---|---|---|---|---|
| 2,128,035 A | * | 8/1938 | Boetel | 222/92 |
| 2,974,835 A | * | 3/1961 | Herbrick | 222/507 |
| 4,061,254 A | * | 12/1977 | Nilson | 222/494 |
| 4,141,474 A | * | 2/1979 | Nilson | 222/493 |
| 6,309,059 B1 | * | 10/2001 | Ritter | 347/86 |

FOREIGN PATENT DOCUMENTS

| | | |
|---|---|---|
| DE | 19705201 C1 | 4/1998 |
| DE | EP1005999 A2 | 6/2000 |

* cited by examiner

*Primary Examiner*—Ehud Gartenberg
*Assistant Examiner*—Patrick Buechner
(74) *Attorney, Agent, or Firm*—Bullwinkel Partners, Ltd.

(57) ABSTRACT

A pressure-activated flexible valve for use with a container for dispensing fluid material. The valve has a single sealing surface and comprises an inner component having a sealing portion and an outer component having an annular rim that seats against the sealing portion. The outer component also has a flexible portion that changes shape in response to pressure from the container material, thereby opening and closing the valve.

10 Claims, 5 Drawing Sheets

PRESSURE-ACTIVATED FLEXIBLE VALVE

BACKGROUND

1. Field of the Invention

This patent relates to a pressure-activated flexible valve for use with a container for dispensing fluid material. More particularly, this patent relates to a pressure-activated flexible valve attachable to a printing ink cartridge that automatically opens and closes in response to pressure from the ink.

2. Description of the Related Art

Modern ink cartridges for printing presses typically comprise a hollow tubular body, a moveable plunger inserted into one end, and a stationary dispensing fitment attached to the opposite end. The dispensing fitment covers the dispensing end of the tubular body and also serves as a valve for opening and closing the cartridge. Ink is extruded from the cartridge when the plunger is forced toward the dispensing end either manually or, more commonly, by pneumatic pressure.

The valve or dispensing fitment is mounted in sealing engagement within the dispensing (top) end of the tubular body. The valve serves four functions: (1) It controls the flow of ink from the cartridge when the plunger is activated. (2) It prevents the flow of ink at all other times, including during filling, transportation, storage, and installation of the cartridge on the printing press. (3) It prevents the introduction of air into the cartridge, which can cause localized ink drying at the nozzle and can effect the properties of the ink contents through oxidation or changes in viscosity. (4) It prevents the flow of ink to other areas of the dispensing fitment or printing equipment. (Ink found in these areas can dry and flake off, contaminating the ink reservoir.)

One known ink cartridge valve is that disclosed in Ritter European Patent Document EP 1 005 999 A3. The Ritter valve is equipped with integrally formed elastic wall stays that serve as springs to open and close the valve in response to pressure exerted by the cartridge contents.

Ritter discloses a valve comprising a central body having a dome-shaped sealing portion connected to the inside of the neck of a mouthpiece by bridges, and a valve sleeve mounted over the neck. The valve sleeve has an annular lip that mates with the sealing portion of the central body to close the valve. The valve sleeve is equipped with the integrally formed wall stays that serve as springs. The wall stays stretch in the axial direction when the valve is subjected to internal pressure from the ink, which raises the annular lip, creating an annular opening between the sealing portion and the valve sleeve lip.

Unlike the present invention, the Ritter valve has two moveable sealing surfaces. A first sealing surface is found at the interface of the central body sealing portion and the annular sealing lip. This sealing surface controls the flow of ink out of the cartridge. A second sealing surface is found at the interface of the mouthpiece neck and an annular valve sleeve wiper. This sealing surface is intended to prevent ink from leaking past the mouthpiece neck and into the area around the spring-like wall stays. These sealing surfaces must be manufactured to very tight tolerances and are subject to damage prior to and during assembly.

Thus it is an object of the present invention to provide a dispensing valve for dispensing fluid materials that has only one sealing surface.

Yet another object of the present invention is to provide a valve that is activated by the internal pressure of the container.

Further and additional objects will appear from the description, accompanying drawings, and appended claims.

SUMMARY OF THE INVENTION

The present invention is a pressure-activated valve for use with a container for dispensing fluid material. In a preferred embodiment, the valve comprises an outer component and an inner component. The outer component comprises a covering portion and a nozzle mounted on the covering portion. The nozzle has a substantially cylindrical sidewall, a top edge, and an annular flexible portion extending radially inward from the top edge of the sidewall and terminating in a rigid annular rim.

The inner component comprises a sidewall and a stationary sealing portion connected to the sidewall via bridges. The inner component is affixed to the inside of the nozzle sidewall and mates closely therewith. The sealing portion and the rigid annular rim of the outer component cooperate to form a seal when the valve is in the closed position. When the valve is in the open position, the sealing portion and annular rim define an annular opening through which the fluid material may flow.

In a key aspect of the invention, the annular flexible portion of the outer component is configured to flex upward and outward when subjected to sufficient pressure from the container fluid material, thereby moving the rigid annular rim between a closed position to an open position. In the preferred embodiment, the flexible portion has a substantially S-shaped cross-sectional profile.

In an alternative embodiment, rather than extending inward from the top edge of the nozzle sidewall, the flexible portion forms part of the nozzle sidewall and works like a bellows by expanding and contracting in response to changes in the container internal pressure. When the container internal pressure is below a certain level (i.e. when the flexible portion is in the contracted position), the rigid annular valve rim of the outer component seats against the convex sealing portion of the inner component to close the ink cartridge and prevent the flow of ink. When sufficient pressure is exerted on the valve by the container contents, the flexible portion expands, exposing an annular opening between the valve rim and the sealing portion, which allows the flow of ink out of the cartridge.

In a third embodiment of the invention, both the nozzle sidewall and the annular portion extending inward from the top edge of the nozzle are flexible. When sufficient pressure is exerted on the valve by the container contents, the nozzle sidewall and/or the annular portion flexes, exposing an annular opening between the valve rim and the sealing portion, which allows the flow of ink out of the cartridge.

In a fourth embodiment of the invention, the stationary sealing portion is attached directly to the container, and a substantially cup-shaped outer component having a flexible portion for opening and closing the valve is mounted onto the sealing portion.

DETAILED DESCRIPTION OF THE INVENTION

The invention is a pressure-activated valve for fluid dispensing containers, such as ink cartridges for commercial printers. The valve opens when acted upon by the pressurized fluid inside the container and closes when the pressure is reduced. The valve has a flexible portion that acts in a spring-like fashion to open and close the valve. This flexible portion may take the form of an inwardly extending ring having a wavy cross-sectional profile (FIGS. 1 to 4 and 7), a cylindrical bellows (FIG. 5), or both (FIG. 6). Regardless of the configuration of the flexible portion, the valve has only one sealing surface.

For purposes of illustration, the pressure-activated valve in the attached figures is shown as it might be used with a tubular paperboard ink cartridge for dispensing printing ink, although it will be understood that the valve may be used with other types of containers, including but not limited to metal containers, squeeze tubes and bags, and with other types of fluid materials, including gases, powders, emulsions and pastes. The ink cartridge is depicted with its valve or dispensing end pointing up, although the dispensing end would ordinarily point down when the cartridge is in use.

Figure 1:
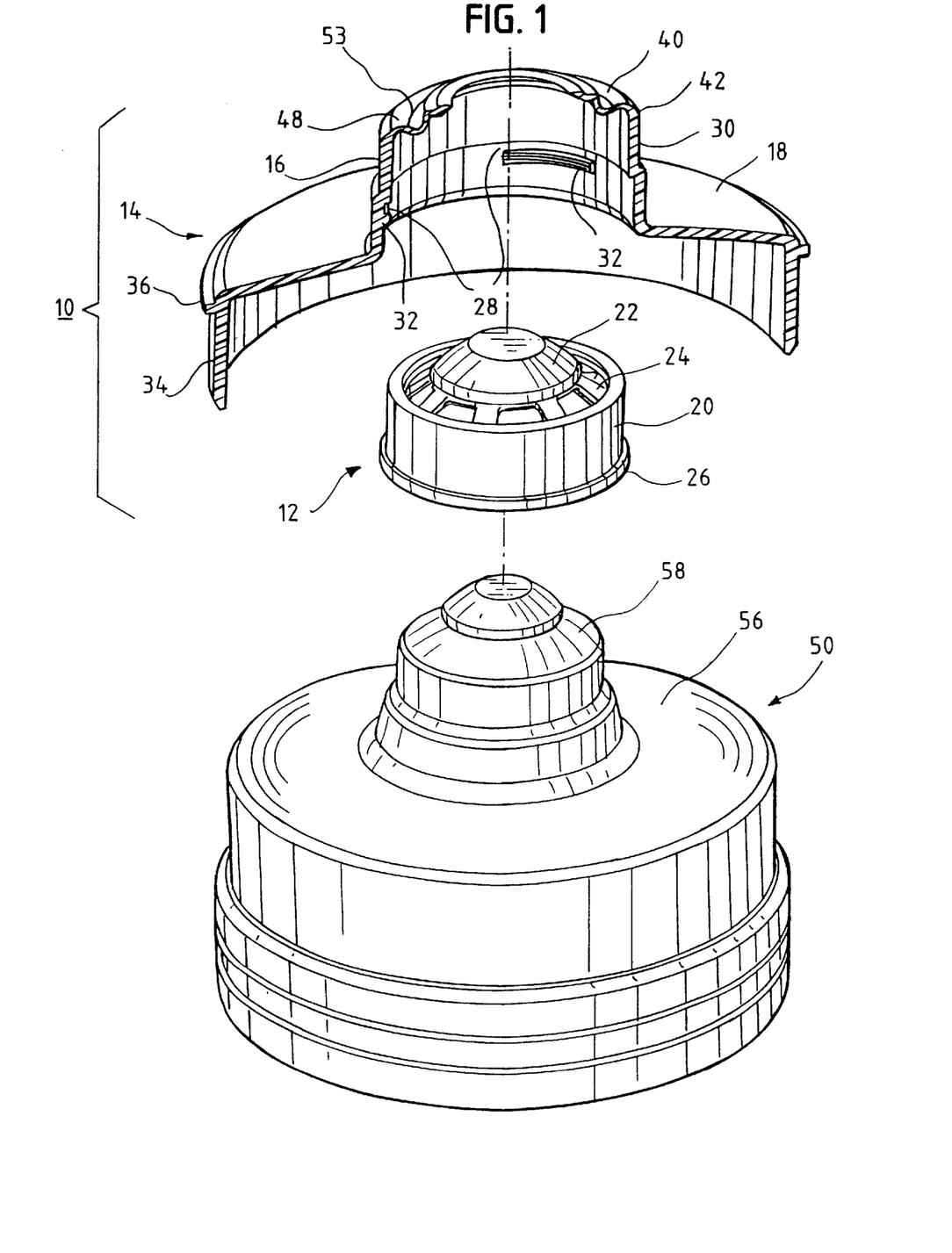
FIG. 1 is an exploded bottom perspective view of the pressure-activated flexible valve of the present invention, including a cutaway view of the outer component, shown with a plunger.
Figure 2:
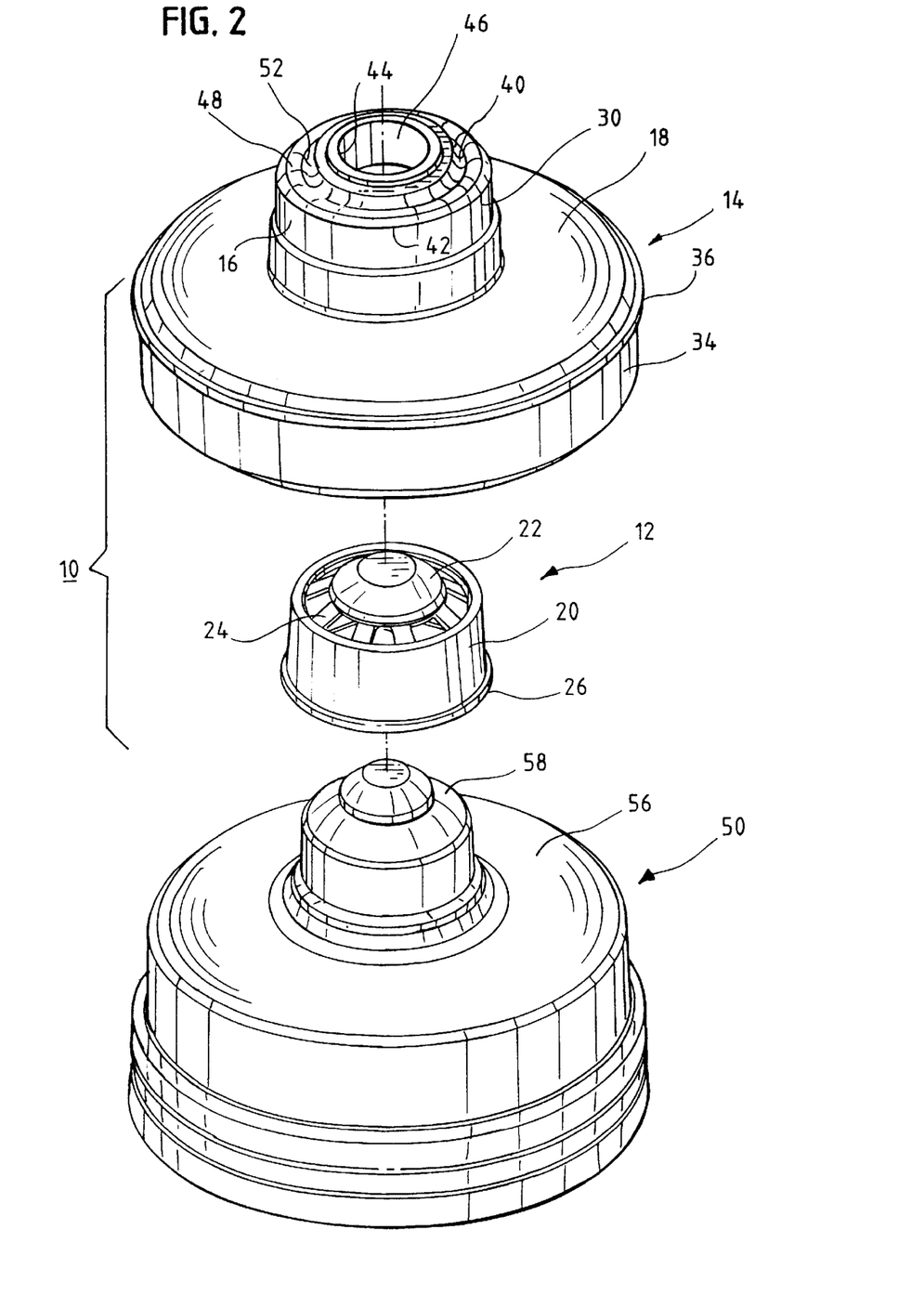
FIG. 2 is a top exploded perspective view of the pressure-activated flexible valve and plunger of FIG. 1.

FIGS. 1–4 show a first embodiment of the pressure-activated valve in which the flexible portion takes the form of an inwardly extending ring having a wavy cross-sectional profile. FIGS. 1 and 2 are exploded perspective views of the valve or dispensing fitment 10 and a plunger 50 which, when inserted into opposite ends of a cylindrical tube (not shown), form an ink cartridge. The valve 10 has two parts: an inner (mating) component 12 and an outer component 14. The outer component 14 may have an integrally formed nozzle portion 16, as shown in the figures. Alternatively, the nozzle portion 16 may be formed as a separate piece that is attached to a covering portion 18 of the outer component 14.

The inner mating component 12 comprises a cylindrical sidewall 20 and a preferably dome-shaped sealing portion 22 connected to the sidewall 20 by bridges 24. The inner component 12 is affixed to the nozzle portion 16 of the outer component 14, for example, by means of an annular flange 26 disposed around the base of the cylindrical sidewall 20. The flange 26 forms a snap fit within a channel 28 located circumferentially around the inside of the nozzle sidewall 30. In the illustrated embodiment, the bottom surface of the channel 28 is defined by detents 32 extending radially inward from the inside surface of the nozzle sidewall 30. Alternatively, the inner component 12 may be affixed to the nozzle portion 16 of the outer component 14 by screw means, heat welding, or any other suitable means, or the inner component 12 may be an integral part of the nozzle portion 16, i.e. formed from the same piece of material. Regardless of the means by which the inner component 12 is affixed inside the nozzle 16, the inner component 12 should mate closely with the inside of the nozzle 16 to minimize wasted ink. In this regard, the outer diameter of the inner component sidewall 20 should be about the same as the inner diameter of the nozzle sidewall 30.

Returning to the outer component 14, a sidewall 34 extends downward from the periphery of the covering portion 18. The sidewall 34 fits snugly into the dispensing end of a cylindrical cartridge body (not shown in the figures) and may have a flange 36 that extends radially outward from the top of the sidewall 34 to abut the upper rim of the cartridge body when the outer component 14 is fully inserted into the body. Alternatively, the sidewall can be extended to such a length that it serves as the cartridge body.

The nozzle 16 is mounted over a centrally disposed aperture in the outer component covering portion 18 and, in the preferred embodiment, comprises a sidewall 30 and an annular flexible portion 40 extending radially inward from the top edge 42 of the nozzle sidewall 30. The flexible portion terminates in a rigid annular rim 44. The annular rim 44 defines a centrally located opening 46. For a typical printing ink cartridge, this opening 46 is about ¾ inches in diameter, although it can be much smaller or larger.

Figure 3:
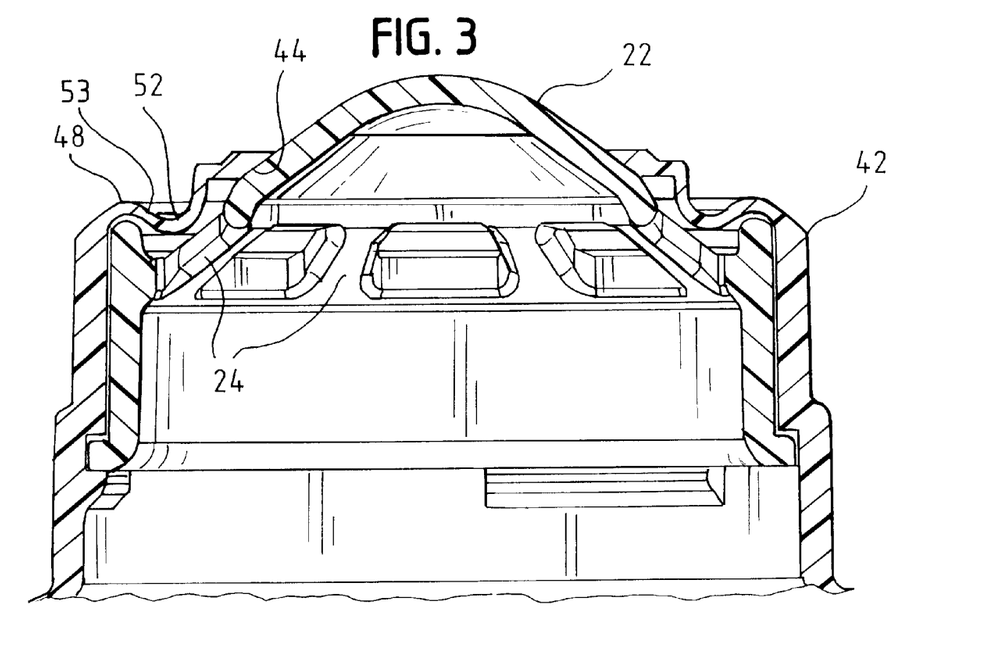
FIG. 3 is a cross-sectional view of an assembled pressure-activated flexible valve made according to the present invention, shown in the closed position.
Figure 4:
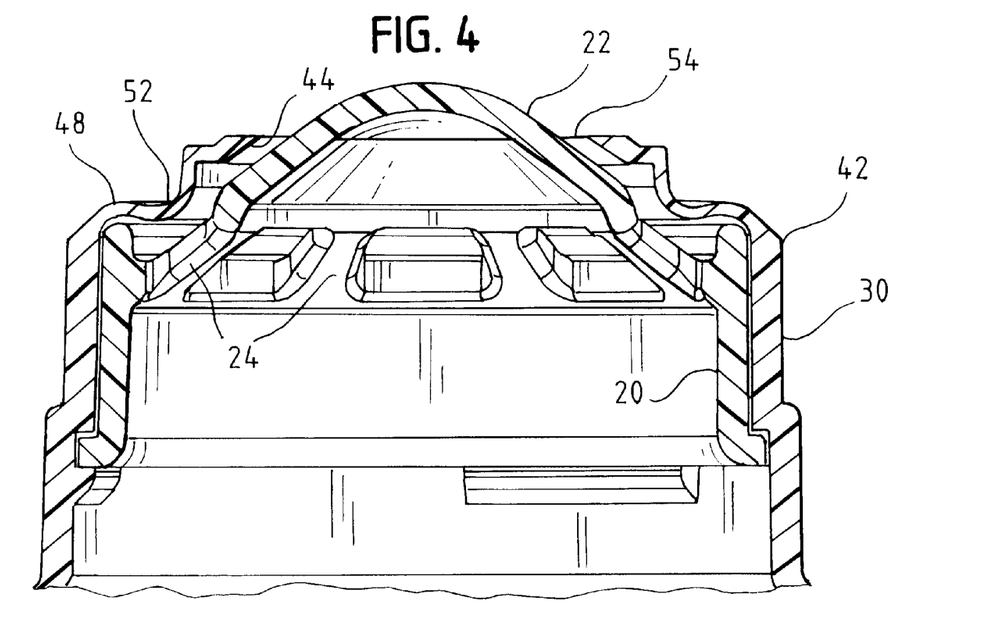
FIG. 4 is a cross-sectional view of the pressure-activated flexible valve of FIG. 3, shown in the open position.

The flexible portion 40 of the nozzle 16 has a geometry and thickness that enables it to flex under pressure, from a closed position, shown in FIG. 3, to an open position, shown in FIG. 4. In the embodiment shown in FIGS. 1 to 4, the flexible portion 40 takes the shape of an inwardly extending ring having a curved or wavy cross-sectional profile, such as the S-shape shown in the Figures. Preferably, the flexible portion 40 comprises a convex portion 48 and a concave portion 52. The convex portion 48 is shaped like the upper half of a circular toroid and the concave portion 52 is shaped like the bottom half of a circular toroid. The two toroidal surfaces 48, 52 are joined at an intersection 54 and together have an approximate S-shaped cross-sectional profile.

Although the flexible portion 40 of the nozzle 16 has just been described as comprising a single convex portion and a single concave portion, it will be appreciated that other configurations would also be suitable, including configurations having multiple convex and concave portions, a convex portion only, or a concave portion only. The primary requirement of the flexible portion is that it be capable of flexing between closed and open positions in response to changes in pressure exerted by the container contents and be able to maintain an adequate seal between the rim 44 and the sealing portion 22 when in the closed position.

As shown in FIG. 3, when there is little or no internal pressure exerted by the container contents (i.e. when the flexible portion 40 is in the closed position), the valve rim 44 seats against the sealing portion 22 to close the ink cartridge and prevent the flow of ink. In the illustrated embodiment, the sealing surface, i.e., the surface where the rim 44 seats against the sealing portion 22, is shaped substantially like a truncated cone. This single sealing surface reduces the chance of leakage of material out of the container or the chance of air leaking back into the container. To insure a good, leak-proof seal between the opposing surfaces of the valve rim 44 and the sealing portion 22, the flexible portion 40 is pre-stressed by the sealing portion 22 when the inner component 12 is snapped into place inside the nozzle portion 16 of the outer component 14.

As shown in FIG. 4, when sufficient internal pressure is exerted on the valve 10 by the container contents, the flexible portion 40 flexes upward and outward, exposing an annular opening 54 between the valve rim 44 and the sealing portion 22, which allows the flow of ink out of the cartridge. When the pressure is again reduced, the flexible portion 40 returns to its original shape and the valve 10 closes.

The plunger 50 is configured to mate closely with the dispensing fitment 10, thereby minimizing the amount of residual ink left in the cartridge after the plunge travels the full distance inside the container body. Thus the top surface 56 of the plunger 50 mates with the outer component covering portion 18 and the plunger central hub 58 mates with the inner component 12 and the nozzle 16.

Figure 5:
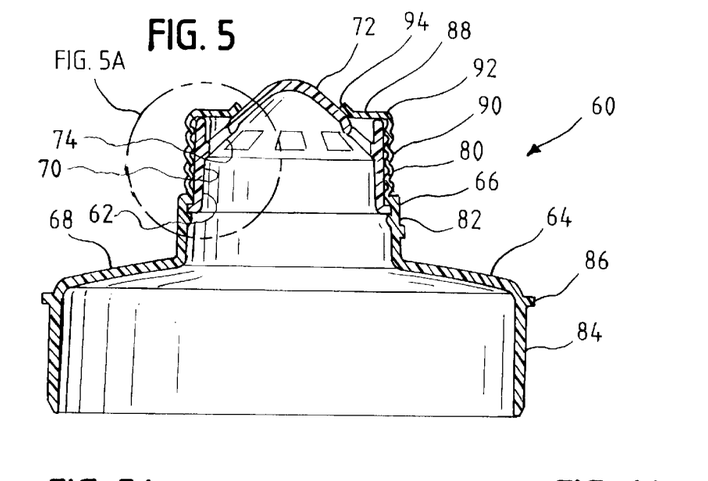
FIG. 5 is a cross-sectional view of a second embodiment of the pressure-activated valve of the present invention.
Figure 5A:
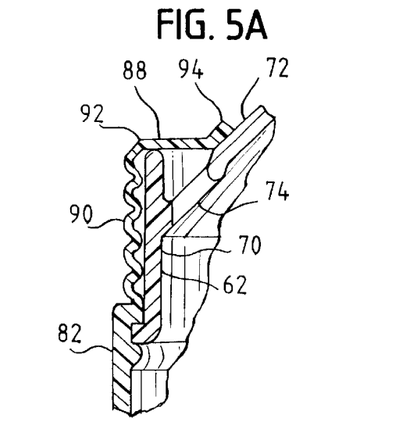
Figure 6:
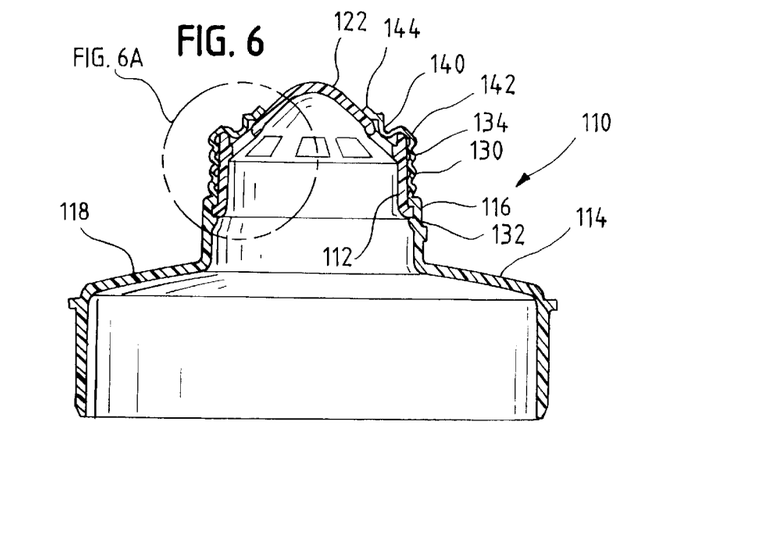
FIG. 6 is a cross-sectional view of a third embodiment of the pressure-activated valve of the present invention.
Figure 6A:
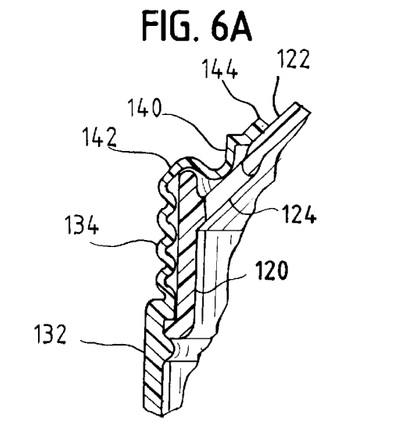

In a second embodiment shown in FIG. 5, the flexible portion of the valve is shaped like a cylindrical bellows, or what might be termed accordion shaped. The valve or dispensing fitment 60 shown in the figure comprises an inner component 62 and an outer component 64. As in the preferred embodiment, the inner component 62 comprises a cylindrical sidewall 70 and a sealing portion 72 connected to the sidewall 70 by bridges 74. The inner component 62 is affixed to the nozzle portion 66 of the outer component 64 and mates closely with the inside of the nozzle 66.

The outer component 64 comprises a covering portion 68, a sidewall 84 extending downward from the periphery of the covering portion 68, and the nozzle portion 66, which is mounted over a centrally disposed aperture in the covering portion 68. The sidewall 84 fits snugly into the dispensing end of a cylindrical cartridge body (not shown) and may have a flange 86 that extends radially outward from the top of the sidewall 84. An annular top portion 88 extends inward from the top edge 92 of the nozzle sidewall 80 and terminates in a rigid annular rim 94.

In this alternative embodiment, rather than extending inward from the top edge of the nozzle sidewall as in the preferred embodiment, the flexible portion forms part of the nozzle sidewall 80. Specifically, the nozzle sidewall 80 has a relatively rigid lower portion 82 (to which the inner component 62 is affixed) and a flexible, expansible upper portion 90. The expansible upper portion 90 is substantially cylindrical and works like a bellows by expanding and contracting in response to changes in the container internal pressure. There are no openings in the flexible portion 90. As in the preferred embodiment, the primary requirement of the flexible portion 90 is that it be capable of expanding and contracting between closed and open positions in response to changes in pressure exerted by the container contents, and be able to maintain an adequate seal between the rim 94 and the sealing portion 72 when in the contracted position.

As shown in FIG. 5, when there is little or no internal pressure exerted by the container contents (i.e. when the flexible portion 90 is in the contracted position), the valve rim 94 seats against the sealing portion 72 of the inner component 62 to close the ink cartridge and prevent the flow of ink. When sufficient pressure is exerted on the valve 60 by the container contents, the flexible portion 90 expands, exposing an annular opening (not shown) between the valve rim 94 and the sealing portion 72, which allows the flow of ink out of the cartridge. When the pressure is reduced, the flexible portion 90 contracts into its original shape and the valve 60 closes.

In a third embodiment of the invention shown in FIG. 6, both the nozzle sidewall and the annular portion extending inward from the top edge of the nozzle are flexible. As with the previous embodiments, the valve or dispensing fitment 110 comprises an inner component 112 and an outer component 114. The inner component 112 comprises a cylindrical sidewall 120 and a sealing portion 122 connected to the sidewall 120 by bridges 124. The inner component 112 is affixed to the nozzle portion 116 of the outer component 114 and mates closely with the inside of the nozzle 116.

The nozzle portion 116 is mounted over a centrally disposed aperture in the covering portion 118 of the outer component 114. The nozzle 116 comprises a sidewall 130 and an annular top portion 140 extending inward from the top edge 142 of the nozzle sidewall 130 and terminating in a rim 144. The annular top portion 140 is flexible, having a geometry similar to that of the flexible portion 40 in the preferred embodiment.

Like the second embodiment, the nozzle sidewall 130 comprises a relatively rigid lower portion 132 (to which the inner component 112 is affixed) and a flexible, expansible upper portion 134. The expansible upper portion 134 is substantially cylindrical and works in cooperation with the flexible annular top portion 140 to open and close the valve 110 in response to changes in the container internal pressure.

As shown in FIG. 6, when there is little or no internal pressure exerted on the valve 110 by the container contents, the valve rim 144 seats against the sealing portion 122 of the inner component 112 to close the ink cartridge and prevent the flow of ink. When sufficient pressure is exerted by the container contents, the flexible expansible portion 134 expands and/or the annular flexible portion 140 flexes upward and outward, exposing an annular opening (not shown) between the valve rim 144 and the sealing portion 122 and allowing the flow of ink out of the cartridge. When the pressure is reduced, the flexible expansible portion 134 and the flexible annular portion 140 return to their original shapes and the valve 110 closes.

Figure 7:
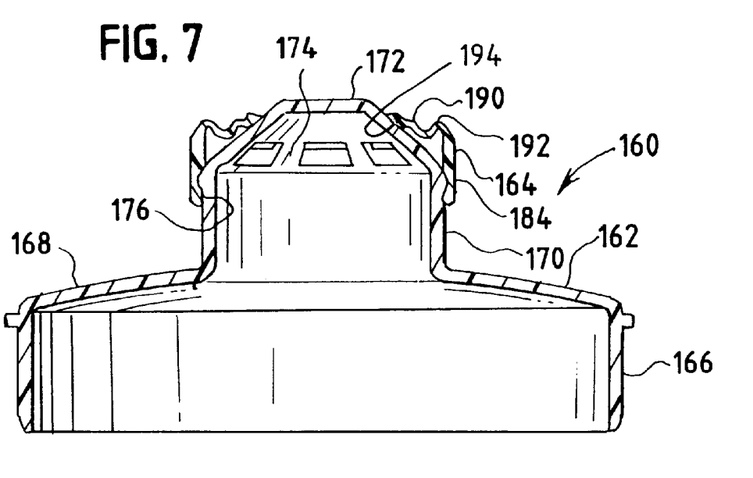
FIG. 7 is a cross-sectional view of a fourth embodiment of the pressure-activated valve of the present invention.

In a fourth embodiment of the invention shown in FIG. 7, the valve 160 comprises an inner component 162 and an outer component 164 as in the previous embodiments, except that in this embodiment the inner component 162, not the outer component 164, is attached directly to the container. The cup-shaped outer component 164 is mounted onto the inner component 162.

The inner component 162 comprises a covering portion 168, a cylindrical sidewall 170 extending upward from the covering portion, and a sealing portion 172 connected to the sidewall 170 by bridges 174. A second sidewall 166 extends downward from the periphery of the covering portion 168 and is configured to fit tightly inside the dispensing end of the ink cartridge.

The cup-shaped outer component 164 is mounted over the inner component 162, preferably by means of a radially inwardly extending flange 176 located at the base of the sidewall 184 that snaps over the sidewall 170. An annular top portion 190 extends inward from the top edge 192 of the sidewall 184 and terminates in a rim 194. The annular top portion 190 is flexible, having a geometry similar to that of the flexible portion 40 in the preferred embodiment.

As shown in FIG. 7, when there is little or no internal pressure exerted on the valve 160 by the container contents, the valve rim 194 seats against the sealing portion 172 of the inner component 162 to close the ink cartridge and prevent the flow of ink. When sufficient pressure is exerted by the container contents, the annular flexible portion 190 flexes upward and outward, exposing an annular opening between the valve rim 194 and the sealing portion 172 and allowing the flow of ink out of the cartridge. When the pressure is reduced, the annular flexible portion 190 returns to its original position and the valve 160 closes.

Figure 8A:
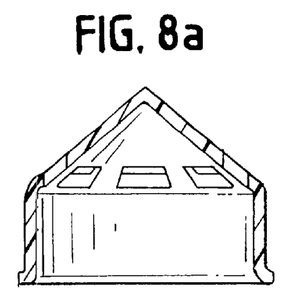
FIGS. 8a–c are cross-sectional views of three possible configurations of the sealing portion of the present invention.
Figure 8B:
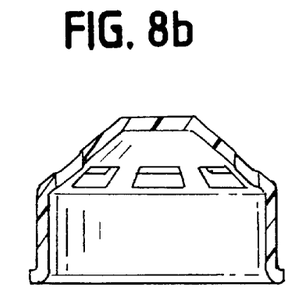
Figure 8C:
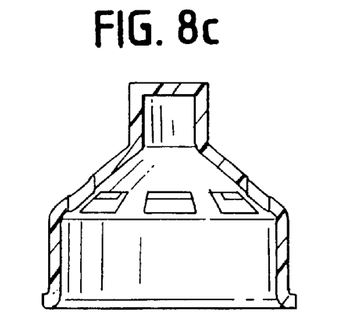

The sealing portion need not be dome-shaped, as shown in FIGS. 1–6, nor shaped like a truncated cone, as shown in FIG. 7. The sealing portion can be any shape that provides a suitable sealing area with the annular rim. FIG. 8 shows three possible configurations of the sealing portion of the invention. In FIG. 8a the sealing portion is conical. In FIG. 8b the sealing portion is shaped like a truncated cone, as in FIG. 7. In FIG. 8c the sealing portion has a more complex shape.

Thus there have been described four embodiments of a pressure-activated flexible valve having a single dynamic sealing area. The single sealing area reduces the chance of leakage of material out of the container or the chance of air leaking back into the container. The valve comprises a first, stationary component having a sealing portion, and a second moveable component having an annular rim that seats against the sealing portion. The second component also has a flexible portion that changes shape in response to pressure from the container contents, thereby opening and closing the valve. The flexible portion may be part of the annular top portion of the valve, the valve sidewall, or both.

The pressure-activated valve controls the flow of ink from the cartridge when the plunger is activated, prevents the flow of ink at all other times, minimizes the introduction of air into the cartridge, and prevents the flow of ink to other areas of the dispensing fitment or printing equipment.

Other modifications and alternative embodiments of the invention are contemplated which do not depart from the scope of the invention as defined by the foregoing teachings and appended claims. It is intended that the claims cover all such modifications that fall within their scope.

I claim as my invention:

1. A pressure-activated valve for use with a container for dispensing fluid material, the valve comprising:
   an outer component comprising a covering portion for covering an end of the container and having a centrally disposed aperture, a sidewall extending axially downward from the periphery of the covering portion, and a nozzle mounted over the aperture, the nozzle comprising a sidewall extending axially upward from the periphery of the aperture and having a top edge and an annular flexible portion extending radially inward from the top edge of the nozzle sidewall and terminating in a rigid annular rim, the flexible portion being configured to flex upward and outward when subjected to sufficient pressure from the container fluid material, thereby moving the rigid annular rim between a closed position to an open position; and
   an inner component comprising a sidewall and a stationary sealing portion connected to the inner component sidewall via bridges, the inner component being affixed to the nozzle sidewall to mate closely therewith, the sealing portion and the rigid annular rim cooperating to form a seal when the rigid annular rim is in the closed position, the sealing portion and annular rim defining an annular opening when the annular rim is in the open position.

2. The pressure-activated valve of claim 1 wherein the flexible portion has a substantially S-shaped cross-sectional profile.

3. The pressure-activated valve of claim 1 wherein the sealing portion is dome-shaped.

4. The pressure-activated valve of claim 1 wherein the inner component further comprises an annular flange disposed around the base of the inner component sidewall, and the flange forms a snap fit within a channel located circumferentially around the inside of nozzle sidewall.

5. The pressure-activated valve of claim 4 wherein the channel has a bottom surface defined by detents extending radially inward from the inside surface of the nozzle sidewall.

6. A pressure-activated valve for use with a container for dispensing fluid material, the valve comprising:
   an outer component comprising a nozzle, the nozzle comprising a substantially cylindrical sidewall having a top edge and an annular top portion extending radially inward from the top edge of the sidewall and terminating in a rim, the nozzle sidewall comprising a substantially bellows-shaped non-perforated expansible portion, the expansible portion being configured to expand and contract in response to changes in the container internal pressure, thereby moving the rim between a closed position and an open position; and
   an inner component comprising a sidewall and a stationary sealing portion connected to the inner component sidewall via bridges, the inner component being affixed to the nozzle cylindrical sidewall to mate closely therewith, the sealing portion and the rim cooperating to form a seal when the rim is in the closed position, the sealing portion and annular rim defining an annular opening when the rim is in the open position.

7. The pressure-activated valve of claim 6 wherein the expansible portion is shaped like a bellows.

8. In an ink cartridge comprising a hollow cylindrical body for holding a supply of extrudable ink, the cylindrical body having a dispensing end and a plunger end, the plunger end being closed by a plunger adapted to serve as a piston within the cylindrical body to extrude the ink when the plunger is forced toward the dispensing end, the dispensing end being closed by a dispensing fitment, the dispensing fitment comprising a covering portion for covering the dispensing end and having a centrally disposed aperture and a sidewall extending downward from the periphery of the covering portion, the improvement comprising:
   a nozzle mounted over the central aperture in the dispensing fitment, the nozzle having a substantially cylindrical sidewall extending axially upward from the periphery of the aperture and having a top edge and an annular flexible portion extending radially inward from the top edge and terminating in a rigid annular rim, the flexible portion being configured to flex upward and outward when subjected to sufficient pressure from the container fluid material, thereby moving the rigid annular rim between a closed position to an open position; and
   an inner component comprising a sidewall and a convex stationary sealing portion connected to the inner component sidewall via bridges, the inner component being affixed to the nozzle cylindrical sidewall to mate closely therewith, the sealing portion and the rigid annular rim cooperating to form a seal when the rigid annular rim is in the closed position, the sealing portion and annular rim defining an annular opening when the annular rim is in the open position.

9. A pressure-activated valve for use with a container for dispensing fluid material, the valve comprising:
   an outer component comprising a nozzle, the nozzle comprising a substantially cylindrical sidewall having a top edge and an annular flexible portion extending radially inward from the top edge of the sidewall and terminating in a rigid annular rim, the nozzle sidewall comprising a substantially cylindrical expansible portion, the annular flexible portion being configured to flex upward and outward and the expansible portion being configured to expand when each is subjected to sufficient pressure from the container fluid material, thereby moving the rim in an axial direction from a closed position to an open position; and
   an inner component comprising a sidewall and a convex stationary sealing portion connected to the inner component sidewall via bridges, the inner component being affixed to the nozzle cylindrical sidewall to mate closely therewith, the sealing portion and the rim cooperating to form a seal when the rim is in the closed position, the sealing portion and annular rim defining an annular opening when the annular rim is in the open position.

10. A pressure-activated valve for use with a container for dispensing fluid material, the valve comprising:

a first component comprising a covering portion for covering an end of the container and having a centrally disposed aperture, a cylindrical sidewall extending axially downward from the periphery of the covering portion, a neck portion extending axially upward from the periphery of the aperture, and a stationary sealing portion connected to the neck by bridges; and a substantially cup-shaped second component mounted over the first component neck and comprising an axially oriented sidewall having a top edge and a flexible annular top portion extending radially inward from the top edge and terminating in a moveable rim, the flexible portion being configured to flex upward and outward when subjected to a predetermined amount of pressure from the container fluid material, thereby moving the rim from a closed position to an open position, the rim and the sealing portion cooperating to form a seal when the rim is in the closed position, the rim and the sealing portion defining an annular opening through which fluid may flow when the rim is in the open position.

* * * * *